(12) United States Patent
Lau et al.

(10) Patent No.: US 6,855,428 B2
(45) Date of Patent: Feb. 15, 2005

(54) BORON CARBIDE BASED CERAMIC MATRIX COMPOSITES

(75) Inventors: Sai-Kwing Lau, Broadview Heights, OH (US); Salvatore J. Calandra, Macedonia, OH (US); Thomas D. Nixon, Akron, OH (US); Edward R. Stover, Akron, OH (US)

(73) Assignee: B. F. Goodrich Company, Charlotte, NC (US)

( * ) Notice: Subject to any disclaimer, the term of this patent is extended or adjusted under 35 U.S.C. 154(b) by 234 days.

(21) Appl. No.: 10/452,009

(22) Filed: Jun. 2, 2003

(65) Prior Publication Data

US 2004/0058154 A1 Mar. 25, 2004

Related U.S. Application Data

(63) Continuation of application No. 09/676,250, filed on Sep. 29, 2000, now abandoned.

(51) Int. Cl.⁷ .......................... B32B 9/04; B32B 15/00; B32B 31/12
(52) U.S. Cl. ................. 428/408; 428/293.4; 428/294.1; 428/446; 188/255
(58) Field of Search .......................... 428/408, 293.4, 428/494.1, 446; 188/255

(56) References Cited

U.S. PATENT DOCUMENTS

| | | | |
|---|---|---|---|
| 4,287,259 A | 9/1981 | Riley et al. | 428/408 |
| 4,396,663 A | 8/1983 | Mitchell et al. | 428/111 |
| 4,605,440 A | 8/1986 | Halverson et al. | 75/238 |
| 4,668,579 A | 5/1987 | Strangman et al. | 428/367 |
| 4,702,770 A | 10/1987 | Pyzik et al. | 75/236 |
| 4,789,021 A | 12/1988 | Ahrens | 164/436 |
| 4,863,798 A | 9/1989 | Arenz et al. | 428/368 |
| 4,886,682 A | 12/1989 | Singh et al. | 427/56.1 |
| 4,889,686 A | 12/1989 | Singh et al. | 419/13 |
| 4,915,760 A | 4/1990 | Singh et al. | 156/89 |
| 4,931,311 A | 6/1990 | Singh et al. | 427/56.1 |

(List continued on next page.)

OTHER PUBLICATIONS

Author: C.R. Thomas; title: "Essentials of Carbon—Carbon Composites", published by: The Royal Society of Chemistry, in 1993, in Cambridge, Great Britain; Chpater 3, pp. 67 through 102.
PCT International Search Report, PCT/US01/29439, dated Jun. 6, 2002.

Primary Examiner—Deborah Jones
Assistant Examiner—Jason Savage
(74) Attorney, Agent, or Firm—Brinks Hofer Gilson & Lione

(57) ABSTRACT

The present invention is a composite material and process to produce same. That material comprises a fibrous structure which is initially predominantly coated with elemental carbon; that fibrous structure is then subsequently predominantly coated with at least one ceramic material, e.g., boron carbide, which is non-reactive with silicon. The composite material also comprises a silicon matrix which is continuous and predominantly surrounds the fibrous structure, which has been initially predominantly coated with elemental carbon and subsequently predominantly coated with at least one ceramic material. The matrix which has a fine grain crystalline structure of predominantly 20 microns or less in size. The at least one ceramic material is discontinuous within that matrix. The fibrous material pulls out of the elemental carbon, which initially predominantly coats that fibrous structure, when the composite is subjected to fracture.

27 Claims, 7 Drawing Sheets

U.S. PATENT DOCUMENTS

| | | | |
|---|---|---|---|
| 4,944,904 A | 7/1990 | Singh et al. | 269/60 |
| 5,007,508 A | 4/1991 | Lacombe | 188/251 |
| 5,015,540 A | 5/1991 | Borom et al. | 428/698 |
| 5,021,367 A | 6/1991 | Singh et al. | 501/88 |
| 5,043,303 A | 8/1991 | Singh et al. | 501/90 |
| 5,051,301 A | 9/1991 | Singh et al. | 428/288 |
| 5,067,998 A | 11/1991 | Singh et al. | 156/89 |
| 5,103,942 A | 4/1992 | Schmitt | 188/251 |
| 5,160,676 A | 11/1992 | Singh et al. | 264/60 |
| 5,217,770 A | 6/1993 | Morris, Jr. et al. | 428/36.3 |
| 5,294,489 A | 3/1994 | Luthra et al. | 428/379 |
| 5,296,311 A | 3/1994 | McMurtry et al. | 428/688 |
| 5,312,660 A | 5/1994 | Morris et al. | 428/36.3 |
| 5,330,849 A | 7/1994 | Kennedy et al. | 428/552 |
| 5,330,854 A | 7/1994 | Singh et al. | 428/698 |
| 5,376,427 A | 12/1994 | Singh et al. | 428/110 |
| 5,387,299 A | 2/1995 | Singh et al. | 156/89 |
| 5,407,734 A | 4/1995 | Singh et al. | 428/224 |
| 5,432,253 A | 7/1995 | Singh | 501/92 |
| 5,436,042 A | 7/1995 | Lau et al. | 428/34.6 |
| 5,480,678 A | 1/1996 | Rudolph et al. | 427/248.1 |
| 5,484,655 A | 1/1996 | Lau et al. | 428/367 |
| 5,515,585 A | 5/1996 | Sheehan et al. | 28/104 |
| 5,526,914 A | 6/1996 | Dwivedi et al. | 192/107 |
| 5,580,643 A | 12/1996 | Kennedy et al. | 428/212 |
| 5,585,165 A | 12/1996 | Kennedy et al. | 428/212 |
| 5,609,707 A | 3/1997 | Bazshushtari et al. | 156/148 |
| 5,620,791 A | 4/1997 | Dwivedi et al. | 428/323 |
| 5,629,101 A | 5/1997 | Watremez | 428/701 |
| 5,643,514 A | 7/1997 | Chwastiak et al. | 264/640 |
| 5,688,577 A | 11/1997 | Smith et al. | 428/113 |
| 5,725,077 A | 3/1998 | Taylor et al. | 188/251 |
| 5,806,636 A | 9/1998 | Atmur et al. | 188/251 |
| 5,817,432 A | 10/1998 | Chwastiak et al. | 428/698 |
| 5,840,221 A | 11/1998 | Lau et al. | 264/29.7 |
| 5,853,485 A | 12/1998 | Rudolph et al. | 118/715 |
| 5,869,411 A | 2/1999 | Bazshushtari et al. | 442/340 |
| 5,878,849 A | 3/1999 | Prunier, Jr. et al. | 188/251.4 |
| 5,945,062 A | 8/1999 | Chwastiak et al. | 264/640 |
| 5,952,100 A | 9/1999 | Corman et al. | 428/384 |
| 6,022,505 A | 2/2000 | Rauscher et al. | 264/643 |
| 6,079,525 A | 6/2000 | Dietrich et al. | 188/251 |
| 6,086,814 A | 7/2000 | Krenkel et al. | 264/610 |
| 6,110,268 A | 8/2000 | Gross et al. | 106/36 |
| 6,261,981 B1 | 7/2001 | Dietrich et al. | 501/95.2 |

BORON CARBIDE BASED CERAMIC MATRIX COMPOSITES

This application is a continuation application of U.S. patent application Ser. No. 09/676,250, filed Sep. 29, 2000, now abandoned which is incorporated by reference herein.

FIELD OF THE INVENTION

The present invention relates generally to ceramic matrix composites and more specifically to boron carbide based ceramic matrix composites for application to aircraft braking systems.

BACKGROUND OF THE INVENTION

Current aircraft braking systems utilize either steel or carbon disks that serve as the friction materials and heat sinks. steel-based systems were the original brake materials. They were used on all aircraft until the emergence of carbon-carbon (C—C) composite materials in the 1970s. C—C composites are now the state-of-the-art material for aircraft brake heat sinks and are being used in the vast majority of new military and large commercial aircraft programs.

Ceramic Matrix Composites (CMCs) exhibit some extraordinary thermal and mechanical properties and hold the promise of being outstanding materials for aircraft brake friction applications, as well as attractive candidates for the next-generation heat-sink materials for such applications. A particular CMC system that indeed possesses the potential for use as a next-generation aircraft brake material, and offers potential breakthrough performance, has recently been identified. In particular, brake materials based on a slurry cast/melt-infiltrated boron carbide matrix composite system have been shown to offer extremely attractive benefits relative to both steel and carbon brake materials.

As a class of materials, ceramics are known to possess low density, high hardness and high oxidation resistance; some of them also have attractive heat capacity and thermal conductivity. Compared to the carbon-carbon composites used today, ceramics have the potential of providing some key performance advantages in terms of reduced wear rate, enhanced oxidation resistance, and reduced heat-sink weight and/or volume.

The earliest attempts to use using ceramics for aircraft braking system applications were based on monolithic ceramics and cermets. However, none of these attempts were successful. The major cause for the resultant failures was due to the inadequate mechanical properties, especially low impact resistance and low fracture toughness, associated with the well-known characteristic brittleness of ceramics. Thus, activities on the next-generation heat-sink materials for aircraft braking system applications have focused on the development of fiber-reinforced CMCs that would improve the fracture toughness and impact resistance (reducing the brittleness) while retaining the other advantages of ceramics.

The two prime candidate CMC material systems, identified for aircraft braking system heat-sink applications, are respectively based on silicon carbide (SiC) and boron carbide ($B_4C$) due to thermo-mechanical considerations. Among these two material systems, the $B_4C$-based CMCs have the particular attractions that $B_4C$ is the third hardest material known, with only diamond and cubic boron nitride being harder, and that it has a heat capacity greater than both SiC and carbon. However, $B_4C$-based fiber-reinforced CMCs suitable for aircraft brake application had heretofore never been made due to processing difficulties associated with $B_4C$. Any previous attempts known were limited to materials without fiber reinforcements. For example, U.S. Pat. No. 5,878,849 issued Mar. 9, 1999, discussed infra., describes a cermet material made by infiltrating a pressed preform of $B_4C$ powder (not filament or fiber) with aluminum; the end product is proposed for aircraft brake uses.

Silicon-filled CMCs have been reported in both U.S. and foreign literature to show improved friction coefficients and/or wear life in certain configurations. See, for example: R. W. Froberg and B. A. Grider, "High Friction carbon/carbon Aircraft Brakes", 40th Int. SAMPE Symp., May 8–11, 1995, extended abstracts, pp 942–944; R. W. Froberg and T. E. Pratt, "Brake System with Improved Brake Material", U.S. Pat. No. 4,815,572 issued Jul. 24, 1987 (assigned to Parker Hannifin Corp); W. Krenkel, "CMC Materials for High Performance Brakes", ISTA Conference on Supercars, Aachen, 31 Oct.–4 Nov. 1994 (paper from the German Aerospace Research Establishment Institute of Structures and Design), Stuttgart; A. Lacombe, "Friction System Using Refractory Composite Material", U.S. Pat. No. 5,007,508 issued Apr. 15, 1991 (assigned to SEP, France).

For example, a helicopter brake with a higher static friction coefficient ($\mu$) than C—C, and a stable $\mu$ of 0.30 at all energies including a "rejected take-off" (RTO), was reported by Parker Hannifin Corp. (See R. W. Froberg and B. A. Grider, ibid., and U.S. Pat. No. 4,815,572, ibid.) Chopped carbon fibers were molded, carbonized, and densified to 1.60–1.65 g/cm$^3$ by carbon vapor infiltration (CVI), and then reacted with liquid Si at 1850° C. to form SiC to a depth of 0.06–0.07 inch.

In 1994, the German Aerospace Research Establishment reported sub-scale dynamometer results on a C—C+SiC composite which showed improved stability, lower wear, and shorter processing times than C—C. (See W. Krenkel, ibid.) Pyrolyzed resin-impregnated carbon fiber preforms, infiltrated with Si at 1500° C., yielded composites containing –35% SiC by weight. Friction coefficients varied between 0.2 and 1.0, higher than for C—C under comparable conditions, increasing with decreasing velocity. Wear was not affected by temperature up to 900° C.

Lower net wear rates were disclosed by a patent to SEP covering aircraft brakes in which a C—C composite disk is worn against a disk containing C or Sic fibers and the CVI matrix consists of SiC as the principal phase with minor amounts of C or BN on the fibers. (See U.S. Pat. No. 5,007,508 ibid.)

However, while the foregoing examples illustrate the potential advantages of Si-based CMC's, few of these claims have been independently substantiated. Very often, the friction and wear (F&W) test duty cycle, including load, pressure, or length of testing time and number of cycles were either not reported, or were far less severe than those demanded under realistic aircraft braking conditions. Furthermore, many of these studies only cited either the friction or the wear results, by themselves, instead of the more relevant combined F&W data.

Options in processing boron carbide have been reviewed by Thevenot. See: F. Thevenot, "Boron Carbide—A Comprehensive Review", 1989, pp 2.1–2.23; F. Thevenot, "Formation of Carbon-Boron Bonds", in *Inorganic Reactions and Methods*, ed. J. Zuckerman, A. Hagen, VCH Publishers, New York, 1989, 10, pp 2–11; F. Thevenot, "Sintering of Boron Carbide and Boron Carbide—Silicon Carbide Two-Phase Materials and their Properties", *J. Nucl. Mater.*, 1988, 152, pp 154–162. High thermal conductivity and strength require minimum porosity and attention to the B/C ratio in the solid solution. Monolithic $B_4C$ has often been hot pressed from fine powder in graphite dies at 2375–2475° C., which would not permit inclusion of fiber reinforcements without damage. Hot isostatic pressing (HIP) with glass encapsulated molds of Ti was used to densify $B_4C$ with excess C at 1700° C. (See: H. T. Larker, L. Hermansson and J. Adlerborn, "Hot Isostatic Pressing and its Applicability to Silicon Carbide and Boron Carbide", *Mater. Sci. Monoar.*, 1987 38A pp 795–803; ASEA. Final densities >99% were achieved by sintering without encapsulation at 2000° C. under 200 MPa (29 ksi) Argon pressure for 2 hours. (See K. A. Schwetz, W. Greliner, and A. Lipp, "Mechanical Properties of HIP Treated Sintered Boron Carbide", Inst. Phys. Conf., 1986, Series No. 75, Chap. 5, pp 413–425.) Pressureless sintering with additives that form lower melting borides still required high temperatures, and exaggerated grain growth led to low strength. Furthermore, similar to hot pressing, pressureless sintering is not suitable for the inclusion of fiber reinforcements due to volume shrinkage.

Carbon fiber-reinforced $B_4C$ for Tokamak fusion reactors was prepared at Los Alamos in 1978–1979 by hot pressing multiple layers of coated low-modulus graphite cloth (UCC WCA) at 2100° C. and under a pressure of 32 MPa (4.6 ksi). See: L. R. Newkirk, et. al., "Preparation of Fiber Reinforced Titanium Diboride and Boron Carbide Composite Bodies", *Proc. 7th CVD Con.*, 1979, pp 515–521. [*Proc. 7th Eur Con. CVD*, 1989]; R. E. Riley, et. al, "Preparation and Uses of Amorphous Boron Carbide Coated Substrates", U.S. Pat. No. 4,287,259 issued Sep. 1, 1981. Hot pressed billets with up to 43 vol % $B_4C$ and 1.87 g/cm$^3$ density were obtained; however, fibers were damaged. A 20-cloth laminate with 37 vol % $B_4C$, hot pressed at 2050° C. and under a pressure of 4.6 ksi for 15 min, had flexural strengths of only 7.4–9.9 ksi.

There are several general reviews of boron carbide-carbon vapor deposition (CVD) studies, which have been concerned primarily with coating surfaces at higher temperatures. See: H. Hannache et. al., "Kinetics of Boron Carbide Chemical Vapor Deposition and Infiltration", *Proc. 5th European Conf. on CVD*, 1985, pp 219–233; A. W. Moore and H. F. Volk, "Chemical Vapor Deposition of Boron Carbide", *AMMRC CR* 69–10, August, 1969; L. C. Vandenbulcke, "Theoretical and Experimental Studies on the Chemical Vapor Deposition of Boron Carbide", *Ind. Eng. Chem. Prod. Res. Dev.*, 1985 24, pp 568–575; U. Jansson, "Chemical Vapor Deposition of Boron Carbides", *Materials & Manufacturing Processes*, 6(3), 1991, pp 481–500. Of relevance to infiltrated preforms is information on the effects of deposition conditions and gas ratios on the structure, hardness, and other properties, which vary with the B/C ratio in the deposits. CVI requires sufficient supersaturation to avoid depletion, and a low deposition rate giving a process limited by the surface reaction rate. (See H. Hannache et. al., ibid.) So far, none of the processes cited were useful for densifying fiber or filament preforms.

In summary, prior to the work resulting in the present invention, as described hereinafter in more detail, there was no known practical processing technique for producing dense, fiber-reinforced $B_4C$-based CMCs. It appears that, as a result, no relevant F&W data has been published for $B_4C$-based systems. The development of a suitable fabrication process for fiber-reinforced $B_4C$ CMCs is an important challenge to be overcome.

Additions to carbon fibers of submicron $B_4C$ and $ZrO_2$ powders, and SiC from pre-ceramic polymers, liquid Si, SiO vapor and CVI SiC, plus Si—O—C sol-gel, were evaluated all under internally funded R&D programs. Initially, overall results were mixed. Some promising results were achieved with the CVI-SiC additions, but reproducible levels of significant F&W improvement could not be obtained. In addition, there were concerns about the anticipated high cost of SiC CVI.

The addition of ceramics to carbon fiber preforms from silicon-based liquid precursors was investigated as a lower cost alternative to SiC CVI. Formation of a silicon-oxy-carbide (SiOC) via sol-gel processing resulted in lower wear than materials made by other liquid precursor methods. A heat sink was made with SiOC, and was densified by CVI-C. Strength was acceptable, and dynamometer tests showed 20% lower average wear rate after wear-in than commercially available Boeing 747 C—C brake materials. However, this approach had the drawback of producing a material with low thermal conductivity. Heat treatment to improve conductivity degraded material strength and wear rate.

A cermet is a mixture of ceramic and metal powders, usually very fine powders approaching sub-micron grain size, which are co-sintered, at elevated temperatures, usually in a liquid phase. U.S. Pat. No. 5,878,849 issued Mar. 9, 1999 to Prunier, Jr. et al., assigned to The Dow Chemical Company, discloses boron carbide-aluminum cermets and a process for producing such. In the development of the disclosed process, Al+$B_4C$ particle mixtures were slip cast and heated to 1400° C. to form Al—B, Al—C, and Al—B—C phases with some residual Al solid solution. For other related cermet development, see: D. C. Halverson, A. J. Pyzik, and I. A. Aksay, "Processing and Microstructural Characterization of $B_4C$—Al Cermets", *Ceram. Eng. Sci. Proc.*, 1985, 6, pp 736–744; D.C. Halverson, A. J. Pyzik and I. A. Aksay, "Boron-Carbide-Aluminum and Boron-Carbide-Reactive Metal Cermets", U.S. Pat. No. 4,605,440 issued Aug. 12, 1986; A. J, Pyzik and I. A. Aksay, "Multipurpose Boron Carbide-Aluminum Composite and its Manufacture via the Control of the Microstructure", U.S. Pat. No. 4,702,770 issued Oct. 28, 1987. A rapid omni-directional compaction process for cermets was also studied. See: A. J. Pyzik and A. Pechenik, "Rapid Omnidirectional Compaction of Ceramic-Metal Composites", *Ceram. Eng. Sci. Proc.*, 9, (7–8) pp 965–974 [1988]; S. Ashley, "Ceramic-Metal Composites: Bulletproof Strength", *Mechanical Engineering*, July, 1990, pp 46–51.

A recent attempt was made to reproduce the material publicly disclosed in U.S. Pat. No. 5,878,849, ibid.; the material was fabricated as described in that patent, and subjected to industry standard tests. To wit, the material was slip cast, and "green" bodies were machined to shape before Al infiltration and heat treatment. Final dimensioning of the very hard material was by electrical discharge machining and diamond grinding.

The heat capacity of the cermets of U.S. Pat. No. 5,878,849 was 47% higher than that of C at 700° F. and 5% higher at 1040° F., although thermal conductivity was 20% lower. Tests of this cermet on the HSFT apparatus, described infra., indicated a relatively stable friction coefficient ($\mu$) with wear rates ⅓–½ that of carbon. Nevertheless, low frequency vibration was encountered and most samples fractured during test. When run against itself on a full-scale friction screening machine (FSM), $\mu$ was in the range required for aircraft brakes. However, the test disks were found to cut grooves into one another at stress concentration points, and structural failure later followed. Furthermore, when tested against a C—C disk, the initial $\mu$ was 0.37 for taxi stops and 0.29 for service stops; but after −300 stops, a drastic decline of $\mu$ to unacceptably low levels was encountered. The reason for this severe performance degradation was not clear. A full-scale (PC-12) hybrid brake, with a ceramic rotor tested vs. C—C stators, failed by cracking at the outer radius of the rotor friction face after only one cycle.

The prominent features of the material disclosed and taught by U.S. Pat. No. 5,878,849 can be summarized as follows:

No fiber reinforcements is used.

The article is characterized by a non-continuous metal phase. Aluminum alloys are the most common metal phase, but silicon is also cited.

The article comprises a continuous ceramic phase. Boron carbide in the Dow system is evaluated, as stated above, but other ceramic systems are also cited.

No CVD material is present.

Solid state sintering of the ceramic phase is critical for the formation of a continuous ceramic phase.

The articles exhibit fracture toughness ~5 MPa $m^{1/2}$

The ceramic phase is 85 to 98 vol % of material.

The diameter of the metal regions is only 0.25 to 30 micrometers.

Certain CMC systems are disclosed in a series of U.S. Patents issued to Singh et al, assigned to The General Electric Company. Those patents all disclosed the use inter alia of carbon fiber preforms. As disclosed in those patents, in some embodiments boron carbide can be used. These General Electric patents fall generally into one of two groups. The first group all produce solid state sintered ceramic bodies, wherein the composite matrix is densified by hot-press sintering, and wherein the final sintered body is reduced in size from the body before sintering. Those patents, all of which disclose technology which is unsuitable for producing complex, near-net shape ceramic matrix components, are: U.S. Pat. No. 4,886,682, "Process for Producing a Filament-Containing Composite in a Ceramic Matrix", issued Dec. 12, 1989; U.S. Pat. No. 4,915,760, "Method of Producing a Coated Fiber-Containing Composite", issued Apr. 10, 1990; U.S. Pat. No. 4,931,311, "Method of Obtaining a Filament-Containing Composite with a Boron Nitride Coated Matrix", issued Jun. 5, 1990; U.S. Pat. No. 5,051,301, "Coated Fiber-Containing Composite", issued Sep. 24, 1991; U.S. Pat. No. 5,067,998, "Fibrous Material-Containing Composite", issued Nov. 11, 1991; U.S. Pat. No. 5,160,676, "Fibrous Material-Containing Composite", issued Nov. 3, 1992; and U.S. Pat. No. 5,407,734, "Fiber-Containing Composite", Apr. 18, 1995.

The second group of General Electric patents, as referred to above, discloses the infiltration of a porous body with a molten silicon infiltrant. As disclosed, a limitation is imposed in all cases on the fibrous materials that can be utilized. That limitations is that all must be first coated entirely with boron nitride so as to avoid a reaction and bonding between the silicon infiltrant and the fibrous material, that reaction and bonding which would, according to the disclosure, destroy fiber pull-out capabilities and thus destroy fracture toughness. Those patents are U.S. Pat. No. 4,889,686, "Composite Containing Coated Fibrous Material", issued Dec. 26, 1989; U.S. Pat. No. 4,944,904, "Method of Obtaining a Fiber-Containing Composite", issued Jul. 31, 1990; U.S. Pat. No. 4,981,822, "Composite Containing Coated Fibrous Material", issued Jan. 1, 1991; U.S. Pat. No. 5,021,367, "Fiber-Containing Composite", issued Jun. 4, 1991; U.S. Pat. No. 5,043,303, "Filament-Containing Composite", issued Aug. 27, 1991; U.S. Pat. No. 5,330,854, Filament-Containing Composite", issued Jul. 19, 1994; U.S. Pat. No. 5,376,427, "Ceramic Composite Containing Coated Fibrous Material", issued Dec. 27, 1994; U.S. Pat. No. 5,387,299, Ceramic Composite Containing Coated Fibrous Material", issued Feb. 7, 1995; and U.S. Pat. No. 5,432,253, "Composite Containing Fibrous Material", issued Jul. 11, 1995.

The fabrication and evaluation of SiC-based CMC materials was investigated. The fabrication process used was a variation of a slurry casting/melt infiltration (SC/MI) process previously developed by The Carborundum Company for the preparation of SiC/SiC composites. See: U.S. Pat. No. 5,296,311, "Silicon Carbide Reinforced Reaction Bonded Silicon Carbide Composite", McMurtry et al., issued Mar. 22, 1994; U.S. Pat. No. 5,436,042, "Shaped Green Ceramic Fabric Preform Segments for Fiber Reinforced Composite Article", Lau et al., issued Jul. 25, 1995; U.S. Pat. No. 5,484,655, "Aluminum Nitride-Coated Silicon Carbide Fiber", Lau et al., issued Jan. 16, 1996; U.S. Pat. No. 5,643,514, "Process for Manufacturing a Silicon Carbide Composition", Chwastiak et al., issued Jul. 1, 1997; U.S. Pat. No. 5,817,432, "Silicon Carbide Reinforced Reaction Bonded Silicon Carbide Composite", Chwastiak et al., issued Oct. 6, 1998; U.S. Pat. No. 5,840,221, "Process for Making Silicon Carbide Reinforced Silicon Carbide Composite", Lau et al., issued Nov. 24, 1998; and U.S. Pat. No. 5,945,062, Silicon Carbide Reinforced Reaction Bonded Silicon Carbide Composite", Chwastiak et al., Aug. 31, 1999.

The Carborundum CMC system starts with a SiC fiber-reinforced preform coated with a CVD BN, AlN or $TiB_2$ interface coating. This preform is then impregnated with an aqueous slurry containing Sic powders with a bi-modal particle size distribution. The slurry-impregnated preform is then heated to ~1410° C. and infiltrated with molten silicon. With a hold time of 30 minutes or less, the final infiltration results in a near full-density CMC, with a SiC—Si two-phase matrix, commonly referred to as a Melt-Infiltrated SiC ceramic matrix composite (MI/Sic CMC).

Specimens were prepared by the present inventors in accord with the foregoing published Carborundum process, however the Carborundum process was modified to include carbon fiber preforms rather than the Sic fiber preforms taught by that process. Further, the carbon fiber preforms were CVI coated with carbon, rather than being coated with BN, AlN or $TiB_2$ as taught by the Carborundum process.

The specimens were tested with the MI-SiC CMC specimens wearing against one another, the MI-SiC CMC specimens wearing against carbon-carbon specimens, and the MI-SiC CMC specimens wearing against a hybrid C—C/CVI Sic material. In general, all of the tests indicated that the MI-SiC CMC material had high and stable friction coefficients but imparted much higher wear rates than C—C. All testing was conducted on the High Speed Friction Tester (HSFT) using conditions commonly used by The BFGoodrich Company to evaluate C—C friction materials, as described infra. in the next paragraph.

In the development of the fiber-reinforced $B_4C$ CMCs of the present invention, and for testing of the SiC-based MI-CMC specimens prepared by using the foregoing Carborundum-like process, a High Speed Friction Tester (HSFT) was used to perform friction and wear (F&W) screening on rotor/stator pairs of 0.375-inch thick samples with a 1.55 $in^2$ friction interface, 2.25 inches OD and 1.75 inches ID. The disks are mounted on ceramic insulators, and a thermocouple in the rotor, 0.05 inch from the wear face, records temperature, normally 500–1500° F. Normal force and torque on the stator are measured in a series of stops from 5000 rpm (43.6 ft/sec), which last ~50 seconds. Data are recorded each 0.008 sec. and averaged each 0.55 sec.;

these averages are stored, and the average friction coefficient $\mu$, the rms deviation from average $\mu$, the temperatures and the loads were recorded for a series of stops at fixed pressure, normally between 38 psi and 76 psi on the friction surface. Loads up to 130 psi were applied to obtain high temperatures representative of normal energy or RTO stop conditions. Thickness change at 7 locations around the wear face is measured after each series with a micrometer. A typical standard "up" test sequence used for evaluating CMC materials is 400 stops at 13 psi, 200 stops at 23 psi, 200 stops at 35 psi, 200 stops at 47 psi, 200 stops at 58 psi, 200 stops at 69 psi, and (if an acceptable amount of the wear surface remains and oxidation of the material is limited) 5 stops at 130 psi (-RTO condition). The use of the term "up" indicates that the pressure is increased for each set of stops, beginning at 13 psi and ending up at 69 psi (or 130 psi if acceptable wear surface remains). Typical "down" testing for evaluating CMC materials would be 200 stops at 69 psi, followed by 200 stops at 58 psi., followed by 200 stops at 47 psi, followed by 200 stops at 35 psi, followed by 200 stops at 23 psi and then followed by 400 stops at 13 psi. Typical "up" and "down" testing are depicted on FIGS. 1 and 2 of the drawings. Average wear rate (mils per surface per 1000 stops) is compared for each series, and wear rates after wear-in are compared, usually for the last 200 stops. The sub-scale, high-speed friction tester (HSFT) was used to assess the effects of ceramic additions on friction coefficient ($\mu$) and wear of carbon brakes.

As mentioned above, this series of F&W tests on the HSFT was completed on the SiC-based MI-CMC specimens prepared by using the foregoing Carborundum-like process. Also, as mentioned above, all the test results showed that the MI-SiC CMC materials had high and stable friction coefficients. However, while low wear rates were achieved at low brake pressures, the wear rates at higher pressures often jumped to orders of magnitude higher than that of a typical C—C material.

Post-test characterization revealed that large Sic particles found in the MI-SiC CMC matrix were responsible for the high wear rate. It was curious to find that although the starting SiC powders used in the slurry were very fine (mostly below one micron in size, with a small fraction in the 5 micron range), large SiC crystals (significantly larger than 20 microns) were prevalent in the CMC matrix after processing (see photo micrograph in FIG. 3). On the other hand, most of the starting fine SiC powder particles had virtually disappeared. The presence of the large ($\geq 20$ microns) SiC crystals, instead of the <1 micron SiC particles, may be causing the increase in the wear rate. Since these large SiC crystals were more abrasive than the finer particles, an analogous behavior would be found in the use of coarse grit sand paper instead of fine grit sand paper.

Detailed examination of the post-melt-infiltration material indicated the occurrence of the C interaction with liquid Si, and recrystallization, a process resulting in a microstructure containing large (>20 micron) alpha-Sic particles embedded in large "pools" of Si.

The fact, that these particles were much larger (>20 micron) than the original alpha-Sic particles (mostly <1 micron) used in the starting SiC slurry, is indicative of an interaction between liquid Si and the CVD carbon coating during the melt infiltration process followed by the process of recrystallization of the Sic.

Experimental work has indicated that the following mechanism may be occurring in the application of the modified Carborundum process, as outlined above:

(1) The CVD carbon material deposited on the carbon preform may be reacting with liquid silicon to form a solid SiC layer at the C/Si interface. After that, any further reaction would have to depend on the diffusion of either C or Si reactant through this solid SiC product layer so formed. This would be a very slow process at the low temperatures used in the MI processing (~1410° C.).

(2) Simultaneously, as the thickness of the SiC layer is increasing, some of the SiC formed may also be in the process of being dissolved in liquid silicon at the liquid Si/solid Sic interface (interface 1). However, since liquid silicon has a very low solubility for SiC (less than a few hundred ppm at 1410° C.), such a dissolution process should normally stop very quickly once the saturation limit is reached.

(3) On the other hand, because the slurry contains many alpha SiC particles to start with, they may now be acting as sinks or "seeds" for the growth of larger SiC crystals. The dissolved SiC (hereinafter referred to as SiC) might thus be precipitating on these seeds, leading to the growth of even larger SiC crystals.

(4) With the dissolved SiC precipitating out from the liquid silicon and recrystallizing onto the SiC seeds, the SiC concentration near the crystalline liquid Si/solid SiC crystal interface (interface 2) may become lower; as a result, a SiC concentration gradient may be established in the Si melt between interfaces 1 and 2. This may enable a sustained transport of SiC down the concentration gradient.

The net result may be a reaction, dissolution, and recrystallization cycle that might lead to the growth of large SiC crystals. Also, due to thermodynamic considerations, such a recrystallization and growth process may be favored to occur on the surfaces of the larger SiC particles, and most of the small SiC particles from the original SiC slurry may also be dissolved via a similar process. The end result may be a matrix with a prevalence of large, recrystallized SiC crystals and little or no fine SiC particles.

There is a need to be able to reduce the ceramic particle size, in the MI-Ceramic CMC matrix, to reduce the high wear rate at high brake pressures to a wear rate that is comparable to that of typical C—C materials, if not better.

SUMMARY OF THE INVENTION

It was postulated that if one could substitute submicron particles, of another ceramic material, for SiC, one could fabricate a CMC material, based on that other ceramic, without the fear of large SiC crystal formation. Because, without the presence of SiC particles to act as precipitation "seeds", the process described above can only proceed to step (2). Once the silicon melt is saturated, any further Si/C interactions cannot proceed to steps (3) and (4). Without dissolution and recrystallization, therefore, no large SiC crystals can be formed. For this reason, a slurry cast, melt-infiltrated CMC material, based on another ceramic, might have a significant wear performance advantage over the slurry cast, melt-infiltrated SiC CMC material.

$B_4C$ was selected from among several other possible candidates. Several $B_4C$-based slurry cast, melt-infiltrated CMC test specimens were prepared in an attempt to test the foregoing mechanism and the possibility of a solution to the problem. In contrast to the SiC materials, these $B_4C$ slurry cast materials were indeed found to exhibit a uniform distribution of sub-micron $B_4C$ particles throughout the matrix without the prevalence of large crystals (See FIG. 4). For this reason, the $B_4C$ slurry cast material was predicted to have advantages in regard to wear performance in comparison to the SiC slurry cast material.

Work then became focused on $B_4C$ based CMCs. The results achieved to date have been extremely encouraging.

All of such materials evaluated to date have been fabricated by slurry casting sub-micron $B_4C$ powders into a partially CVD carbon densified carbon fiber preform followed by a melt infiltration of a Si alloy to complete the densification.

The most significant advantage of ceramic-based CMC heat sink materials (other than SiC) appears to be their reduction in wear rate, which, based on initial test results, may be at least 50%. The increased life may possibly cut the actual cost of aircraft brake operation by a substantial and significant amount. Such ceramic-based CMC materials may possibly support brake life up to double that of C—C at a very little increase in brake weight, if any.

The present invention is a composite material. That material preferably comprises a fibrous structure, comprising fibers, which are initially predominantly coated with elemental carbon to initially impregnate the fibrous structure. The fibers of that fibrous structure are then subsequently preferably predominantly impregnated with at least one ceramic material which is non-reactive with silicon, to further impregnate the fibrous structure. The composite material also preferably comprises a silicon matrix which is continuous and predominantly surrounds and encompasses the fibrous structure, that fibrous structure which has already been initially predominantly impregnated with elemental carbon and subsequently predominantly impregnated with at least one ceramic material. The matrix ceramic material preferably has a fine grain crystalline structure of predominantly 20 microns or less in size. The at-least-one ceramic material is preferably discontinuous within that matrix. The fibrous structure fibers preferably pull out of the elemental carbon coating when the composite is subjected to fracture. As used herein, the word "predominantly" means, generally more so than not, or more often than not, depending on the context; in quantifiable terms it means more than half or more than 50%.

The fibrous structure of the present invention can be a plurality of elemental carbon fibers. Alternatively, the fibrous structure of the present invention can be a plurality of either non-oxide ceramic fibers or oxide ceramic fibers.

Preferably, the silicon matrix of the present invention is formed from an alloy comprising silicon, boron and carbon. Alternatively, the silicon matrix of the present invention can be elemental silicon. Optionally, the silicon matrix may also include other alloying elements such as Al, Ni, Ca, Fe, etc. to modify other relevant chemical and/or physical properties of the ceramic matrix composites being produced. Industrial grade silicon, readily available in the marketplace, in many cases, may have impurity levels which include sufficient boron and carbon to form the preferred alloy referred to above. Alternatively, industrial grade silicons, as received from commercial suppliers, may already be that preferred alloy referred to above, or may already include other acceptable alloying elements as mentioned above.

The at-least-one ceramic material preferably comprises boron carbide. Alternatively, other ceramic materials which do not react with silicon can be used or they can be used in combination, depending on the wear and hardness properties desired in the composite which is produced. Examples of such non-reactive ceramic materials are silicon nitride, boron nitride, aluminum carbide and aluminum oxide, but this list is not exhaustive or comprehensive. Beyond this, there may be certain ceramic materials which do react with silicon, but not to the degree and/or in a manner which results in significant degeneration of the useful F&W properties being sought. In other words, the reactivity does not produce recrystallization and SiC grain growth such that large grains predominantly larger than 20 microns are formed. If the reactivity does not produce such recrystallization and grain growth, then the ceramic materials are considered non-reactive within the meaning of the term as used herein.

Preferably, the initial elemental carbon coating essentially encapsulates each of the plurality of elemental carbon fibers of the fibrous structure, although, acceptable results in regard to fiber pull out have been obtained where the elemental carbon coating on the fibrous structure is significantly less than complete. The key is that the silicon matrix not be significantly reacted directly with the underlying fibrous structure. Thus, the fibers are not inhibited from pulling out from the matrix, specifically pulling out from the elemental carbon coating on the fibrous structure, when impact and fracture occurs.

The composite material of the present invention preferably comprises a fibrous structure of elemental carbon, that fibrous structure which is initially predominantly impregnated with elemental carbon, that same fibrous structure which is then subsequently predominantly impregnated with boron carbide. Then preferably a silicon alloy matrix is added. That silicon alloy matrix, which is continuous, predominantly encompasses the fibers of the fibrous structure, after those fibers have initially been predominantly impregnated with elemental carbon and subsequently predominantly impregnated with boron carbide. Preferably, the matrix ceramic material of this composite has a fine grain crystalline structure of predominantly 20 microns or less in size to produce the desired wear characteristics which are hereinafter described. It has been determined that, to fine tune the wear characteristics, the preferred boron carbide should preferably be discontinuous within the matrix.

The present invention also includes a preferred process for producing the foregoing composite material comprising:

a.) forming a fibrous structure comprising fibers into a preform;

b.) initially predominantly coating the fibers of that fibrous structure preform with elemental carbon to impregnate that preform with elemental carbon;

c.) subsequently predominantly impregnating the fibers of that fibrous structure preform with at least one ceramic material, which is preferably non-reactive with silicon, to form an impregnated green body, that at least one ceramic material preferably being predominantly 20 microns or less in crystal size; and d.) then infiltrating that green body with molten silicon to form a continuous matrix throughout the composite, that matrix which essentially does not adhere directly to the fibrous structure, but which does predominantly adhere to the elemental carbon which initially is impregnated into that fibrous structure.

Preferably, in the foregoing process, the fibrous structure preform comprises a plurality of elemental carbon fibers, although alternatively a plurality of either non-oxide ceramic or oxide ceramic fibers may be used. Also, preferably, in the foregoing process, the molten silicon is formed from an alloy comprising silicon, boron and carbon, although alternatively the molten silicon can be formed by melting elemental silicon. Finally, preferably, in the foregoing process, the at-least-one ceramic material comprises boron carbide, although, as exemplified above, other ceramic materials may be used as long as they do not react with silicon to the extent that they degenerate the desired F&W properties. As indicated previously, preferably, the initial elemental carbon coating essentially encapsulates each of the plurality of elemental carbon fibers of said fibrous structure preform. Preferably, the foregoing process includes and further comprises the following steps:

a.) producing a cover mix comprising the silicon alloy, carbon black and liquid phenolic resin;
b.) essentially covering the green body with that cover mix;
c.) (where more complex shapes are to be made, the optional step of) pre-heating the green body, covered with the cover mix, to solidify and set the liquid phenolic resin, thus forming a hardened cover mix (This step is not necessary where simple shapes are to be made.); and
d.) heating up the green body, covered with either the hardened or unhardened cover mix, to the melting point range of the silicon alloy.

As noted above, where simple shapes such as pucks, disks, cubes, etc. are to be made, it is not necessary to solidify and set the liquid phenolic resin; rather the shape can merely be placed in unhardened cover mix and heated. However, where the shapes become more complex, the hardening of the resin is preferred to maintain the precise shape during the heating of that body covered with the hardened cover mix.

The silicon alloy preferably comprises a melt of 90 to 96 Wt. % elemental silicon, 3 to 6 Wt. % elemental boron and 0.5 to 2.0 Wt. % elemental carbon. The foregoing melt is then solidified, bringing the temperature back to ambient, and the solid is then crushed to −16 U.S. Sieve Size. Preferably, the cover mix comprises 90 to 92 Vol. % of crushed silicon alloy, 5.5 to 7.5 Vol. % of the liquid phenolic resin, and 1 to 3 Vol. % of carbon black. As explained hereinafter, the range of elements in the preferred silicon alloy produces what may be explained as an eutectic effect, lowering the melting temperature of the silicon by about 20° C. or slightly more. This effect seems to diminish and substantially disappear when the above stated ranges of alloying elements are violated. That is to say that when any of the foregoing alloying elements is beyond the foregoing stated ranges, the eutectic effect produced by this combination of elements tends to diminish and/or disappear. Also, preliminary experimental evidence indicates that additions of Al, Ca, Fe and/or Ni at alloying levels may be useful in significantly lowering the melting point of silicon. The capillary action of the silicon infiltration into the preform becomes somewhat less smooth when the carbon black is eliminated from the cover mix, resulting in potentially the formation of some minor voids in the silicon matrix. The phenolic resin range is set to get sufficient resin into the cover mix to set and harden, but not so much that when the silicon alloy melt temperature is attained, there is an over abundance of carbon which would tend to promote the excess formation of silicon carbide, a material that is to be avoided as is explained elsewhere herein.

Another aspect of the present invention is a composite material comprising: a fibrous structure which is initially predominantly impregnated with elemental carbon. That fibrous structure then subsequently has placed therein a plurality of holes. Each of those holes is within a range of about 1/16" in diameter and about 1/8" in diameter. Also, each of those holes, from its hole center, is spaced apart from the hole center of each other adjacent hole by a distance within a range of about 1/4" to about 1/2". The fibrous structure is then predominantly impregnated with at least one ceramic material.

The composite material of this aspect of the present invention includes a matrix which is continuous and predominantly encompasses the fibrous structure which has been initially predominantly impregnated with elemental carbon and subsequently predominantly impregnated with at least one ceramic material. The at least one ceramic material of the matrix has a fine grain crystalline structure of predominantly 20 microns or less in size. The at least one ceramic material is discontinuous within the matrix, and the fibrous structure pulls out of that elemental carbon (that same elemental carbon which initially predominantly impregnates the fibrous structure) when the composite material is subjected to fracture.

In this aspect of the present invention, the plurality of holes of the composite preferably extend through the fibrous structure. Also, in this aspect of the present invention, the plurality of holes are preferably located to cover substantially the exposed surface of the fibrous structure.

Preferably, in this aspect of the present invention, the holes are drilled into and through the fibrous structure, as distinguished from another method of placing the holes in that fibrous structure. The holes are preferably about 5/64" in diameter and also, preferably, the hole center of each hole is spaced apart from the hole center of each adjacent hole by a distance of about 11/32".

A feature which distinguishes this aspect of the present invention is the presence of a fibrous structure which is initially predominantly impregnated with elemental carbon, that fibrous structure which then subsequently has placed therein a plurality of holes, each of those holes which is within a range of about 1/16" in diameter and about 1/8" in diameter, each of those holes which, from its hole center, is spaced apart from the hole center of each other adjacent hole by a distance within a range of about 1/4" to about 1/2".

In this feature of the present invention, as mentioned above, the holes preferably extend through the fibrous structure. Also, in this feature of the present invention, the plurality of holes are preferably located to substantially cover the exposed surface of the fibrous structure.

These and other features of the present invention will be further explained and demonstrated in the accompanying drawings and following detailed description of the invention, and are defined by the appended claims.

DETAILED DESCRIPTION OF THE INVENTION

Figure 1:
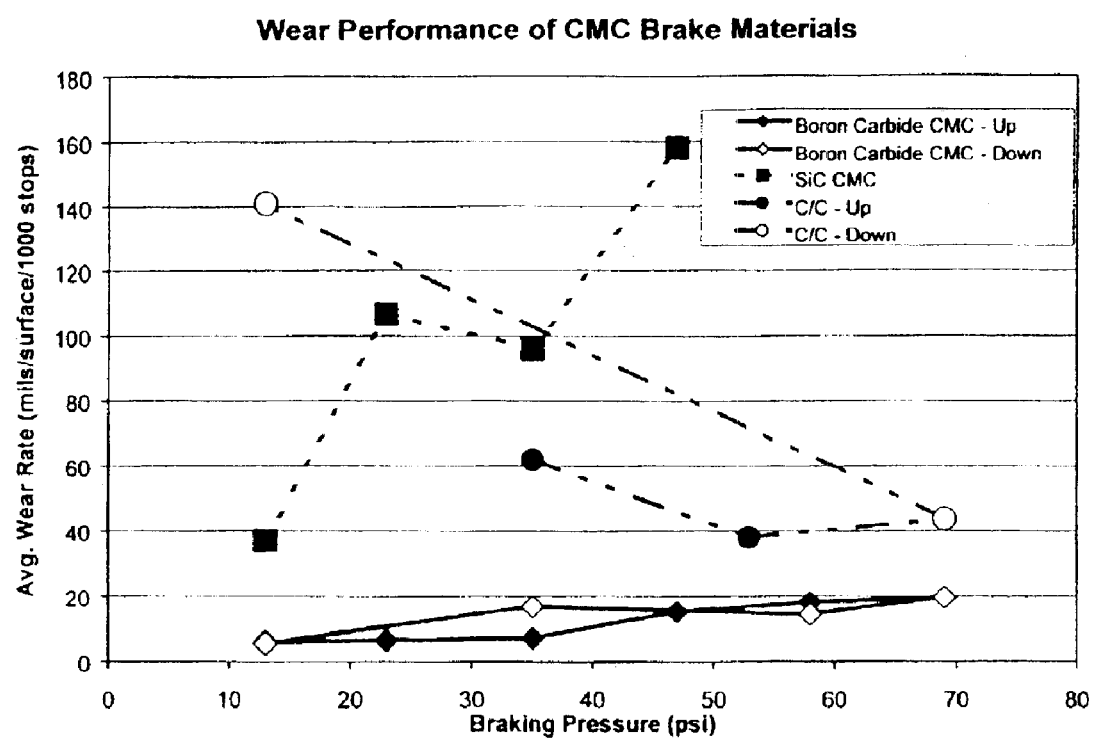
FIG. 1 is a graph comparing the wear rates of various $B_4C$ CMCs with each other and with SiC CMCs and commercial C—C materials.

Several $B_4C$-based slurry cast, melt-infiltrated CMC test specimens were prepared using the following general steps:
(1) Carbon fiber preforms were infiltrated by CVD-carbon both to deposit a surface coating and to partially fill the fiber bundles while leaving a porosity level of about 20–60%.

(2) An aqueous B$_4$C-based slurry was prepared by mixing sub-micron B$_4$C powder with the appropriate additives including wetting agents, dispersants, etc. (Although sub-micron powder was used in this specific testing, it has now been established, so far, that particle sizes up to about 20 μ can be used with quite satisfactory results.)

(3) The coated carbon preform was placed in a plaster of paris mold and slurry cast with the B$_4$C slurry to impregnate the preform pores with B$_4$C particles to form a green body.

(4) After drying, the B$_4$C impregnated green body was placed in a vacuum furnace and infiltrated with molten silicon (which can be alloyed with other elements) to form a near fully dense composite.

The carbon preforms used were standard Duracarb™ and Supercarb™ carbon fiber preforms as produced by The BFGoodrich Company, Charlotte, N.C., however other preforms, produced in accord with published references, are deemed appropriate as well for the foregoing tests and for use in the invention described herein. Those published references are, e.g., U.S. Pat. No. 5,869,411 to Bazshushtari et al., issued Feb. 9, 1999; U.S. Pat. No. 5,853,485 to Rudolph et al., issued Dec. 29, 1998; U.S. Pat. No. 5,688,577 to Smith et al., issued Nov. 18, 1997; U.S. Pat. No. 5,609,707 to Bazshushtari et al., issued Mar. 11, 1997; U.S. Pat. No. 5,515,585 to Sheehan et al., issued May 14, 1996; U.S. Pat. No. 5,480,678 to Rudolph et al., issued Jan. 2, 1996; U.S. Pat. No. 5,312,660 to Morris et al., issued May 17, 1994; and U.S. Pat. No. 5,217,770 to Morris, Jr. et al., issued Jun. 8, 1993.

| Vol % Fiber | Vol % CVD-C | Vol % Si | Vol % B$_4$C |
|---|---|---|---|
| Duracarb ™ Preform Materials Tested | | | |
| 22 | 18 | 30 | 30 |
| 22 | 45 | 16.5 | 16.5 |
| Supercarb ™ Preform Materials Tested | | | |
| 24 | 26 | 25 | 25 |
| 24 | 41 | 17.5 | 17.5 |
| 24 | 56 | 10 | 10 |

The desirable form of CVD carbon coating, on the carbon fiber preforms, is known in the industry as "Rough Laminar" CVD carbon. It is "crystalline" in nature but not true graphite or diamond. As it is heat treated to higher and higher temperatures, it becomes more graphitic in character. The CVD carbon is nearly 100% dense. Other forms of CVD carbon may or may not be present including "Smooth Laminar", "Gas Phase Nucleated', "Dark Laminar", etc.

The B$_4$C powder used in this test sequence was initially not acid treated, however it has now been determined that acid treated powder will provide equivalent results. Nothing is done to control the pH of the slurry. The current preferred B$_4$C powder has an average particle size of ~1.0 microns, although powders with average particle range of <1.0 to ~20 microns may be used. The powder is milled to break up spray dried agglomerates. The preferred slurry mix is:

Generally, 4 parts medium to 1 part powder, by weight; Typical Mix
  200 grams deionized Water (medium),
  60 grams boron carbide (powder),
  0.41 grams ByK-181 Anionic Dispersant from ByK-Chemie,
  0.83 grams ByK-156 Wetting Agent from ByK-Chemie.
  Gives about 20 wt % solids.

The ByK-181 (also known as Disperbyk-181) and the ByK-156 (also known as Disperbyk-156) were obtained from Byk-Chemie USA, 524 South Cherry Street, Wallingford, Conn. 06492. Byk-181 (Disperbyk-181) and ByK-156 (Disperbyk-156) are believed to be registered trademarks. The boron carbide (B$_4$C) used was designated as TETRA-BOR® 3000F and was produced by Elektroschmelzwerk Kempten GmbH of Kempten, Germany and obtained in the USA from Wacker Chemical; it had an average BET surface area of 12 m$^2$/gr.

Both vacuum and elevated pressure are used for slurry infiltration. Drying of the slurry-infiltrated preform is at 80° C. for 1 hour. Because of the rigid, fiber preform, the process produces a "net shape" body, and there is no shrinkage when the Si is introduced and solidified. The density of the slurry-infiltrated-and-dried "green body" is in the range of 1.4 to 1.5 g/cc, and the porosity is both open and closed. These bodies can then be "green machined", but this is rarely done.

The infiltration of the slurry into the preform can be enhanced by drilling a pattern of small diameter holes into the preforms prior to that infiltration. The diameter of the holes may range in size from about 1/16" diameter to about 1/8" diameter with 5/64" diameter being preferred for optimum infiltration. At 1/16" diameter, the rate of infiltration is slower. At 1/8" diameter the amount of slurry infiltration begins to get beyond the desired level and the drying time begins to increase.

Figure 7:
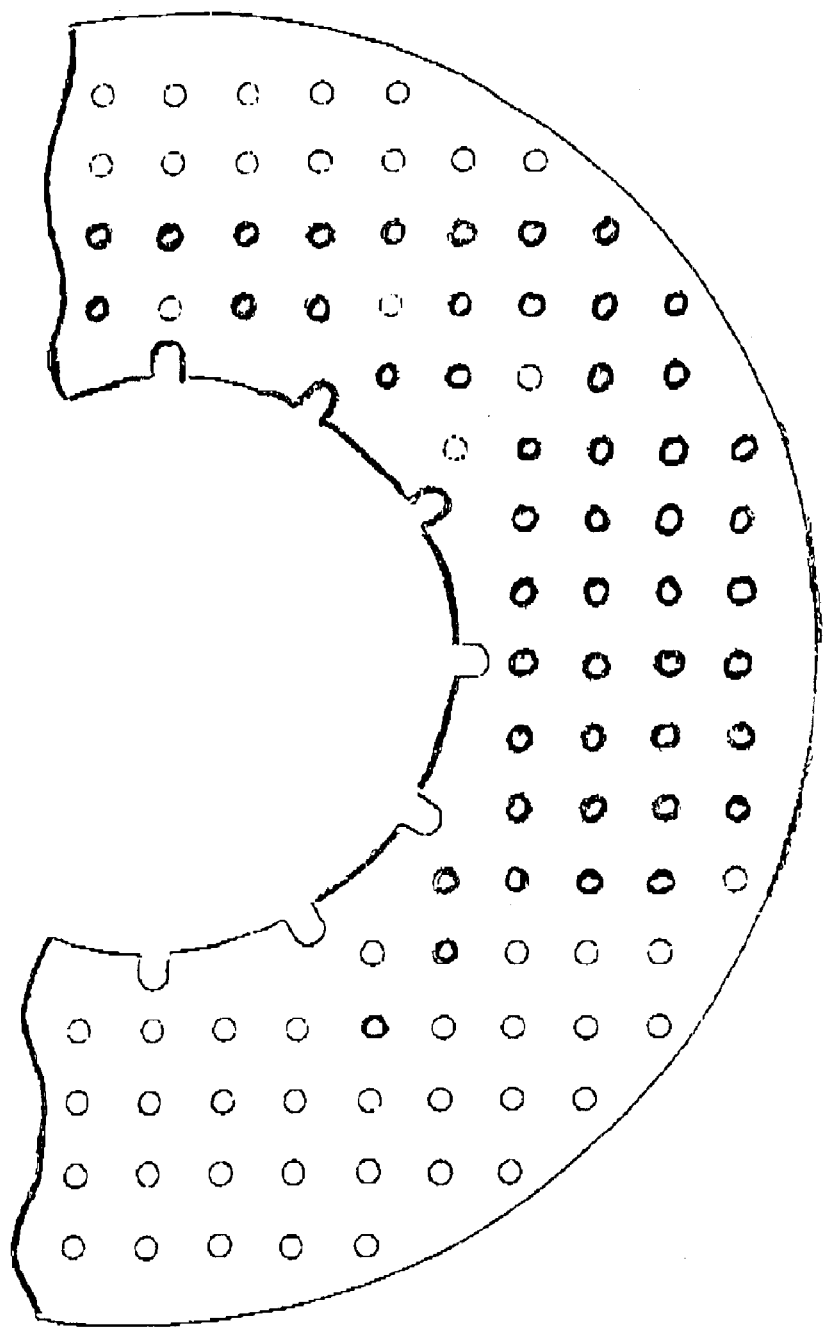
FIG. 7 is a schematic diagram of a drilled hole pattern which may be applied to preforms as an aid in infiltration.

The holes are typically drilled on a grid pattern as shown in FIG. 7, with the spacing between hole centers typically being about 9 mm (about 11/32"). Drilling the holes more that ½" apart appears to decrease the ability of the hole pattern to enhance infiltration of the slurry, while drilling the holes less than ¼" apart is believed to weaken the preform to unacceptable levels. The holes are drilled to penetrate through the thickness of the preforms. A conventional drill press can be used to drill the holes one at a time, using a conventional twist drill, however, in production it is envisioned that automated tooling would be used to accomplish the drilling as will readily be understood by those skilled in the art. The use of drilled holes is preferred for infiltration of preforms which have an open porosity of about 35% or less after CVD treatment of the fiber with carbon, and/or where the preform is about ½" in thickness or greater. The use of the drilled holes ensures a thorough and much more uniform infiltration throughout the thicker and/or more dense preforms, when used.

Note that the holes are drilled into the preforms after the preforms are made, that is, after the carbon fiber in the preforms has been subjected to CVD carbon coating and infiltration, and consequently the fiber is stiffened. If is believed that drilling or otherwise forming the holes in the preform carbon fibers, before applying the CVD carbon, results in the pores adjacent to the holes being reduced in size and, in some cases, filled with carbon during the CVD process, thus significantly reducing the value of the holes in regard to slurry infiltration and thwarting the purpose of drilling those holes in the first place. Thus, it is deemed much preferred that, if holes are used, they be drilled into the preforms after the fiber has been subjected to CVD treatment.

Initial tests have indicated no significant reduction of structural properties in the CMC disks, including holes, of the present invention, in comparison to CMC disks of the present invention without the holes.

Preferably, molten silicon alloy is infiltrated into the green body at about 1435° C., ±25° C., for typically 30 minutes under vacuum, although the elevated temperature time range can be from a low of about 10 minutes to a high of about 200 minutes. In the laboratory, for processing, the green body is typically buried in a "cover mix" comprised of silicon alloy. Alternatively, for production of multiple pieces of brake disks, the disks are stacked and have the cover mix only on the top and bottom of each piece. In other words, in production, the brake disks are stacked in a manner similar to current CVD production techniques, but the cover mix is used to separate the parts. In production, half the silicon alloy needed to densify a given brake disc comes from cover mix on top and half from cover mix below. Currently, for small laboratory parts, a crucible is used to contain the cover mix and a part. For production, furnace hardware is arranged so that the furnace itself is a crucible.

High purity elemental silicon, by itself, without alloying and without formation into a cover mix, can be used for infiltration, but it is not preferred because the melt temperature of elemental silicon is about 20° C. higher than for the alloy describe above, and that lower temperature, plus the addition of some carbon into the alloy and the cover mix tends to reduce and/or diminish the reaction of the molten silicon with the elemental carbon CVD coating on the carbon fibers. On the other hand, commercially available industrial grade silicon powder, when molten, seems to act acceptably in infiltration, without the formation of unacceptable levels of SiC, although a slightly higher melt temperature is experienced.

The preferred silicon alloy is produced by starting with elemental silicon powder, of a size that will pass through a 30 mesh screen but not through a 60 mesh screen (−30 +60, U.S. Sieve size). To this is added elemental boron in a size range of −200 +300, U.S. Sieve size. Then carbon black (amorphous carbon powder) is added in a size range to −200 +300, U.S. Sieve size. The silicon alloy mixture is comprised of 94 wt % elemental silicon, 5 wt % elemental boron and 1 wt % carbon black. These components are thoroughly mixed, for example, by hand, and then preferably the mixture is heated to 1450° C. in a vacuum until it melts. After the melt is brought back down to room temperature, it is ground to −16 mesh, U.S. Sieve Size, to produce the silicon alloy used in the preferred cover mix applicable to the present invention. Alternatively, it has been found that when commercial grades of silicon powder are utilized, an acceptable cover mix can be formed by mixing the silicon, the elemental boron and the carbon black, in the ratio recited above, and, without heating and grinding, but rather using the powder mixture as such for the cover mix.

It should be noted that the foregoing silicon alloy has multiple material phases, and thus is a true alloy, as distinguished from a solution which only is a single phase material. It has been determined that the saturation level of molten silicon, for dissolution of carbon, occurs when the carbon level reaches a maximum of less than about 250 ppm, with levels of carbon significantly above that range (e.g., 300 ppm and above) causing a reaction between the carbon and silicon, thus eliminating the possibility of alloying the carbon with the silicon to form a single phase solid solution. Rather, when carbon is introduced to molten silicon, at levels of about 300 ppm and above, there is a chemical reaction between the silicon and the carbon to form SiC. The SiC, which is formed by this reaction, precipitates as solid sub-micron particles, carrying with it much of the remaining un-reacted carbon. Based on anecdotal evidence, it is believed that the addition of elemental boron to this silicon-carbon two-phase alloy enhances the suspendability of the carbon, avoiding unwanted precipitation, thus promoting the inclusion of the boron in the development of a true multi-phase silicon-boron-carbon alloy. The saturation point of boron in molten silicon is about 1.6 wt %, with boron at or below that level going into the multi-phase alloy. On the other hand, as shown in the second group of General Electric patents, cited above, without the carbon, the boron reacts, and the reactant products precipitate where the boron is present at a level above 1.6 wt %.

The preferred cover mix is prepared by beginning with screened −16 mesh crushed silicon alloy as described above. The crushed silicon alloy is mixed with resin and carbon in the following proportions:

91.2% (by volume) of −16 mesh silicon alloy
  6.8% (by volume) of Varcum® 29353 liquid phenolic resin
  2.0% (by volume) of Raven® 1255 carbon black In the laboratory, these ingredients are hand-mixed together to spread the resin uniformly throughout the silicon alloy and carbon. Machine mixing may alternatively be used to produce a more or less homogeneous mixture. The mixture is, at this point, designated as a "cover mix" or "silicon source mix" and is now about the consistency of damp sand. This cover mix is applied to the top and bottom of the green body in the ratio of about 70% to about 150% (by weight) of the weight of that green body.

In the laboratory, the application of the cover mix to the green body can also be done by, initially, making a temporary form which corresponds to the actual shape and dimensions of the green body to be used. The temporary form holds the cover mix in place in respect to the green body until the cover mix is hardened by the setting of the resin. This procedure is especially preferable for complex shape preforms. Then, the temporary form is removed. Alternatively, the application of the cover mix to the green body may be accomplished by any means readily apparent to those skilled in the art.

Preferably, to speed up the hardening process, the entire assembly (temporary form, green body and cover mix) are placed in a conventional drying oven set to about 130° C. for about 2 hours or until the thermoset resin is hardened. The temporary form is then removed, leaving the green body encased in the hardened cover mix. In the laboratory, this assembly is then placed in a Centorr® electric furnace (described hereinafter) and heated according to the following temperature profile:

Room Temperature to 500° C. in 2 hours
  500° C. hold for 0.5 hours
  500° C. to 1340° in 3 hours
  1340° C. to 1430° C. in 2 hours
  1430° C. hold for 0.25 hours Next, the furnace is shut off and left to cool down to about room temperature before removing the composite part which is produced by the now-infiltrated green body. The Si in the cover mix melts and is absorbed by the $B_4C$ infiltrated green body through capillary action and fills the interstitial space in the preform, densifying significantly, in many cases to less than 2% open porosity. The excess spent cover mix is cleaned off the part leaving a clean and densified composite specimen.

The minimum temperature which will allow for full infiltration is the preferred temperature to be used. Reactions will occur between Si and uncoated carbon fibers to form SiC. This is to be avoided to the extent possible, thus the minimum temperature is used and the carbon fibers are preferably completely coated or encompassed (essentially encapsulated) with a separate layer of CVD elemental carbon. There is some reaction of CVD carbon (coated onto the carbon preform) with the molten Si, but it is difficult to readily and easily measure thickness of this reaction, although the thickness can be measured using optical microscopy, scanning electron microscopy and/or transmission electron microscopy. The object is to confine the Si and C reaction to the CVD carbon coating on the fiber, avoiding the same reaction with the underlying carbon fiber itself. This allows the carbon fiber to "move" within the CVD carbon coating, thus assuring "pull out" of the carbon fibers during toughness fracture testing. This differs from the mechanism employed in the second group of General Electric patents, cited above, wherein the boron nitride coating is CVD "fused" to, or reacted with, the underlying fibers, but does not become wetted by or react with the silicon infiltrant. Thus, in regard to that group of patents, the coating on the fibers slides in relation to the silicon matrix material.

In regard to the present invention, the thickness of the reaction layer, between the CVD elemental carbon coating and the molten silicon, is sub-micron for lower temperatures and short reaction times, and can approach several microns in thickness at higher temperatures and/or where longer reactions times are used. The key is to avoid a total conversions of the CVD layer to SiC and, also, to avoid any significant conversion of the underlying carbon fiber to SiC. Therefore, a reaction layer is acceptable as long as the CVD carbon layer is not totally consumed by the reaction and the carbon fiber remains essentially unreacted.

As noted above, in the modified Carborundum SiC particulate system, substantial re-crystallization is observed. In the $B_4C$ particulate systems of the present invention, no significant large crystals were observed. Post-treatment processing only involves machining. Diamond tools were used to machine the parts, and the disk brake parts were ground flat with parallel faces. The measured bulk density of the final material was 2.10 to 2.20 grams/cm$^3$. This compares favorably to the theoretical full density of $B_4C$ of 2.51 qrams/cm$^3$.

A Centorrs hi-temperature graphite heating element vacuum furnace is used for both silicon alloy preparation and silicon alloy cover mix melt infiltration of slurry cast parts. This furnace has a temperature capability of 2200° C. and a usable uniform hot zone of 16" diam×12" high. A Honeywell® DCP 700 programmable controller is used to control the temperature heat-up profile and it is also setup for "cascade" control. This type of control system produces precise control of inside crucible temperature and eliminates temperature overshoot at final temperature. This furnace is also equipped with a bottom loading table to facilitate loading of heavy loads and is equipped with a Stokes® Microvac® pump which can achieve vacuum levels less than 0.3 Torr.

Figure 3:
FIG. 3 is a photo micrograph showing a MI-SiC CMC exhibiting large SiC crystals formed by C—Si interaction and recrystallization.
Figure 4:
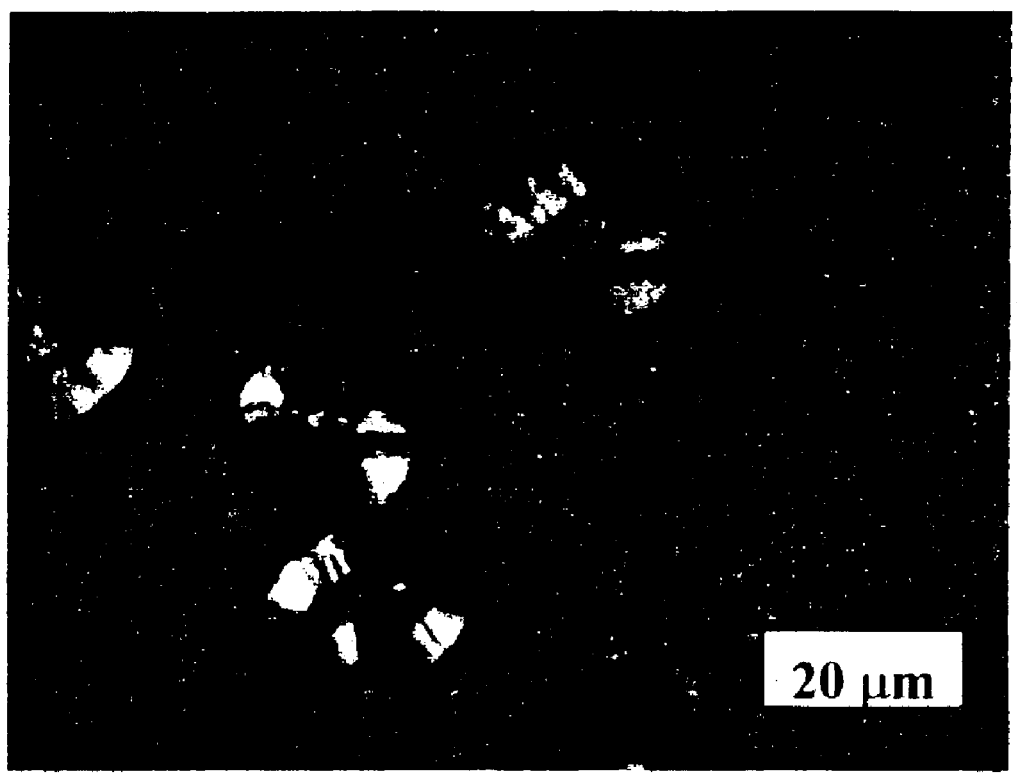
FIG. 4 is a photo micrograph showing a MI-$B_4C$ CMC exhibiting uniform distribution of fine $B_4C$ particles.

The resultant composite was comprised of carbon fiber bundles which were partially infiltrated with CVD carbon, and a Si/$B_4C$ two-phase matrix that contained about 50% $B_4C$ and about 50% silicon as major phases. Microstructural characterization revealed a matrix comprised of a uniform distribution of disconnected, fine and discrete $B_4C$ particles in a "pool" of silicon (alloy). It can be seen from FIG. 4 that this microstructure is very different from the SiC-based MI-CMC, shown in FIG. 3, in that there is no prevalence of large SiC crystals (or an other large, ceramic crystals).

HSFT specimens from $B_4C$-based MI-CMCs were tested in the same manner as the SiC-based composites. For comparison purposes, similar tests were also conducted on a commercial C—C brake material as currently being used on the Boeing 777 aircraft. The friction and wear test results on these materials are shown in FIGS. 1 and 2.

Figure 2:
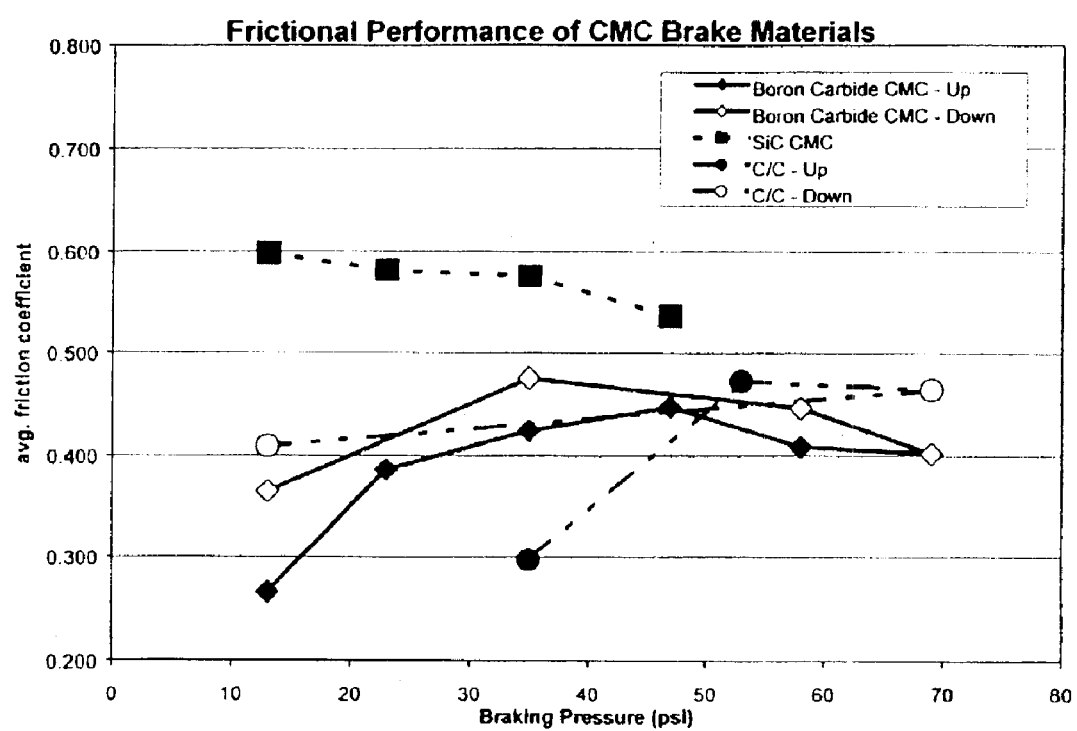
FIG. 2 is a graph comparing the coefficients of friction of various $B_4C$ CMCs with each other and with SiC CMCs and commercial C—C materials.

FIG. 1 compares the wear rates of C—C, SiC based CMCs and $B_4C$ based CMCs over a wide pressure range, including both "up" testing and "down" testing. As can be seen, the wear rate of the $B_4C$ based CMC sample is significantly lower over the entire pressure range. CMC wear rates were measured ranging from ½ to ¼ of the C—C rate at high pressures, and $\frac{1}{10}$ to $\frac{1}{15}$ of the C—C rate at low pressures. These improvements in wear rate were achieved while maintaining a similar friction coefficient (as shown in FIG. 2) to C—C of approximately 0.40 and similar braking temperature profiles. In comparison, the SiC based materials containing the large SiC precipitates showed much higher friction coefficients and much greater wear rates. FIG. 2 demonstrates the unusual temperature and pressure stability of the $B_4C$-based materials. The coefficient remains at ~0.40 through the entire pressure range including the simulated RTO pressure of 130 psi. In addition to the reduced wear rates, this "constant coefficient" is another potential key advantage over C—C whose friction coefficients are known to vary or "fade". For example, full RTO dynamometer testing of production C—C produces a typical friction coefficient of less than 0.20. FIG. 2 shows both "up" testing and "down" testing.

Again, referring to FIGS. 1 and 2, for the $B_4C$-based CMC material, a low and uniform wear rate of 10–20 mils/side/1000 stops was measured throughout the full HSFT test sequence from low pressure to high pressure. The average friction coefficient for the entire pressure sequence ranged from 0.4 to 0.5, except for the initial value of 0.28 at the lowest pressure (13 psi) during wearing-in. For the commercial production Boeing 777 C—C brake material, similar levels of coefficients were measured. However, the minimum wear rate obtained was about 40 mils/side/1000 stops, or twice that measured for the current $B_4C$-based CMC material. Furthermore, at low braking pressures, the C—C had wear rates as high as 140 mils/side/1000 stops, or about 7 to 14 times that of the $B_4C$-based CMC material at the same pressures.

Many of the problems associated with the performance of the MI-SiC CMC materials have been demonstrated to be not a factor with the $B_4C$-based material. The reason for the superior performance of the $B_4C$-based CMC material over MI-SiC CMC material can most probably be explained by the fact that the $B_4C$-based CMC material does not have the large crystal growth problem observed for the matrix of the SiC composite, confirming the earlier prediction.

Simulated RTO tests were also conducted on a pair of the MI-$B_4C$ CMC HSFT specimens. The friction coefficients obtained were found to be in the 0.4–0.5 range, similar to the values obtained at the lower pressures. The wear rate obtained was in the 70–80 mils/side/1000 stops range. These are believed to be very respectable numbers for the simulated RTO conditions.

The low wear rates, 50% or less than those of the current commercial Boeing 777 C—C brake material, could extend the service life of the brakes, give more landings per overhaul, and/or provide the basis for new heat sink designs with lower weight and/or volume. The uniform friction coefficients over a wide range of braking pressure conditions could produce more stable and predictable braking performance.

The uniform friction coefficients as a function of braking pressure may be key in making the invention an important development for non-aircraft braking applications including large truck and train brakes. While conventional C—C has survived severe train brake test conditions, the test results have demonstrated that the coefficient of friction for C—C is dependent on the energy input. This has made conventional C—C a relatively poor choice for train brake applications as control systems on trains (as well as large trucks) are often simple and cannot compensate for changes in coefficient of friction. However, the relatively "flat" coefficient of friction measured for the CMC materials of the present invention may make them better candidate materials for such non-aircraft types of braking applications.

Another problem with carbon brakes which is not expected to occur with the brakes of the present invention is the susceptibility to degradation of the friction coefficient resulting from water that is strongly adsorbed on the carbon surfaces (i.e., the carbon surfaces have a strong affinity for water), when the braking conditions do not heat the surfaces sufficiently to drive off the adsorbed water. High humidity environments or direct exposure to water result in more adsorption and greater difficulty in preventing brakes from "fading". The temperature necessary for adequate de-sorption may also be higher if carbon-oxygen complexes on the wear faces have incorporated phosphorous adsorbed when phosphate oxidation inhibitors are applied to brake disk surfaces exposed to air.

It has been noted in testing the MI-$B_4C$ CMC material of the present invention that the amount of water or moisture present has essentially no effect on the ability of brakes made of the CMC material to stop the aircraft in a given distance. In other words, sufficient water to degrade the coefficient of friction was not adsorbed onto the surface in the wear debris, since a smaller portion of that debris consists of carbon in comparison to standard C—C aircraft brakes. Also, in the example described, oxidation recession of the CMC did not occur in stops that caused high temperature and significant edge recession of a C—C material. If addition of phosphate inhibitors to the exposed surface of the brake disks is not required to prevent loss to dimensions or structural integrity during service, the reductions of coefficient of friction resulting from accidental incorporation of phosphate in the wear debris will also be avoided.

Furthermore, the MI-$B_4C$ CMC material disclosed herein can be fabricated with a slurry cast/melt infiltration process that requires relatively simple production facilities, low cost tooling, and short processing times. This is very different from the common perception that CMCs are too expensive for common commercial applications.

Features of the Present Invention Material

The preferred embodiment of the present invention employs PAN-based carbon fibers (polyacrylonitrile) woven into a pseudo 3D preform, but it is believed that other fibers should work as well. Those other fibers include pitch-based carbon fibers, Rayon® fabric-based carbon fibers, and both oxide and non-oxide ceramic fibers.

The preferred embodiment of the present invention contains a metallic silicon alloy phase, with a maximum of about 250 ppm of carbon dissolved therein, that alloy which, in the matrix, is more or less continuous throughout the structure. The combined matrix, including the silicon alloy and the $B_4C$, is fully continuous throughout the structure, thus ensuring the structural integrity of objects produced therefrom.

The present invention contains ceramic particulate in the matrix, in the preferred embodiment boron carbide, and other oxide or non-oxide ceramics which do not encounter the problems described above in relation to the use of SiC in disk brake applications. The ceramic particulates are not continuous, but are isolated between fiber bundles and/or within the silicon matrix material.

The present invention preferably includes chemically vapor deposited (CVD) elemental carbon, on the fibers; however, alternatively, carbon layers from non-CVD sources, e.g., resin, pitch, etc., may surround the fiber bundles to insure good performance. That is to say that each fiber bundle could be coated and thus impregnated using resin, pitch, etc., followed directly or indirectly with heating to drive of the volatile matter and reduce the resin, pitch, etc. to more or less pure carbon, thus eliminating the need for CVD carbon treatment of the carbon bundles (preforms).

In the present invention, there is no sintering or significant re-crystallization of the ceramic particulates. This differs from the SiC processes described above wherein the re-crystallization of the SiC inherently produces at least some significant degree of reaction bonding. The best performing materials tend to be those wherein reactions between the particulates and other particulates, the silicon matrix, the CVD carbon layer, and/or the carbon fibers, are avoided. Materials in which the particulate has reacted with other elements of the microstructure have exhibited high wear rates.

In the preferred embodiment of the present invention, fracture toughness is indicated to be in the range of >20 Mpa $m^{1/2}$.

Breakthrough Advantages of the Present Invention

Successful development of fiber reinforced, ceramic matrix composites (CMCS) are seen to provide breakthrough innovation over C—C for aircraft brakes in several key areas:

1. Lower Brake Life-Cycle Cost—Ceramics are very hard materials, and can have intrinsically lower wear rates relative to C—C aircraft brakes. These reduced wear rates directly translate to reductions in cost per landing as compared to the cost of C—C materials. Furthermore, with the refractory nature of ceramics, oxidation resistance appears to be greatly improved with the use of CMC material. Oxidation is a critical issue with carbon brake applications, as oxidation can cause early retirement of carbon disks from service, and reduce the ability to reuse the disks at the time of brake overhaul. As a result, current carbon brakes all require the additional processing step of an oxidation inhibitor application. This not only increases the complexity and cost of brake manufacturing, it does not actually resolve the problem entirely. Complaints of problematic oxidation involving some current carbon brakes are still being reported in the field. It is possible that through application of the present invention, oxidation inhibitors for commercial aircraft brakes might be eliminated. From a combination of reduced wear and reduced oxidation, it is anticipated that disk life can be at least doubled compared to current carbon disks. Even higher lifetime gains may be possible, for example, up to 4 times greater life for a ceramic compared to carbon.

2. Tailorable and More Uniform Friction Coefficients— Initial sub-scale testing of boron carbide-based CMCs was performed, as indicated above. The F&W performance of the $B_4C$-based materials appears to be tailorable by adjusting the relative percentages of the ceramic and carbon constituents and the particle size distribution of $B_4C$. The friction coefficients also appear to possess the desired stability in regard to both temperature and pressure. In comparison, typical C—C materials exhibit a wide range of coefficient values, those values which are dependent upon the braking conditions. A reduced range of friction coefficients will provide benefits by decreasing the brake "sensitivity" ("grabbiness" for example) at taxi conditions. This is attractive to aircraft operators (i.e., airlines).

3. Reduced Brake Weight and Volume—Boron carbide has a higher heat capacity than carbon. However, the silicon used to bond the matrix has a lower heat capacity that offsets the volume and weight reduction gained from using the boron carbide. Simple heat transfer calculations made using the assumption that the CMC materials contain 17.5 vol % boron carbide, 17.5 vol % silicon, and 65 volt carbon, predict that the CMC will require 5% greater weight and 1% greater volume to maintain the same peak operating temperature for a given energy input when compared to a C—C heat sink. However, the lower wear rate should still allow weight and volume to be removed from the brake design. An aircraft brake is designed so that the heat sink is capable of a Rejected Take-Off (RTO) in the fully worn (end of the heat sink life) condition. The 5% weight increase and 1% volume increase mentioned above apply to the worn mass (WM) and worn volume (WV) of the fully worn heat sink. From the WM and WV, the new, as-delivered heat sink design mass (DM) and design volume (DV) are calculated by multiplying the anticipated wear rate of the heat sink material (units of mils/surface/1000 stops) by the desired number of landings per overhaul (LPO). Based on the observed wear rates, the new, as-delivered DM and DV for a given CMC heat sink turns out to be significantly less than what would be necessary for an equivalent C—C heat sink. This is why a weight and volume reduction, on new, as-delivered heat sinks, should still be achievable if the CMC materials wears at only half the rate of typical C—C materials (the CMC heat sink wear rate presently exhibited is about one-quarter the wear rate of equivalent C—C heat sinks; i.e., the CMC heat sinks presently last about four times as long as equivalent C—C heat sinks).

4. In regard to sensitivity to moisture, none of the $B_4C$-based materials prepared so far have shown any stability problems when exposed to typical laboratory humidity testing for extended periods of time.

Figure 5:
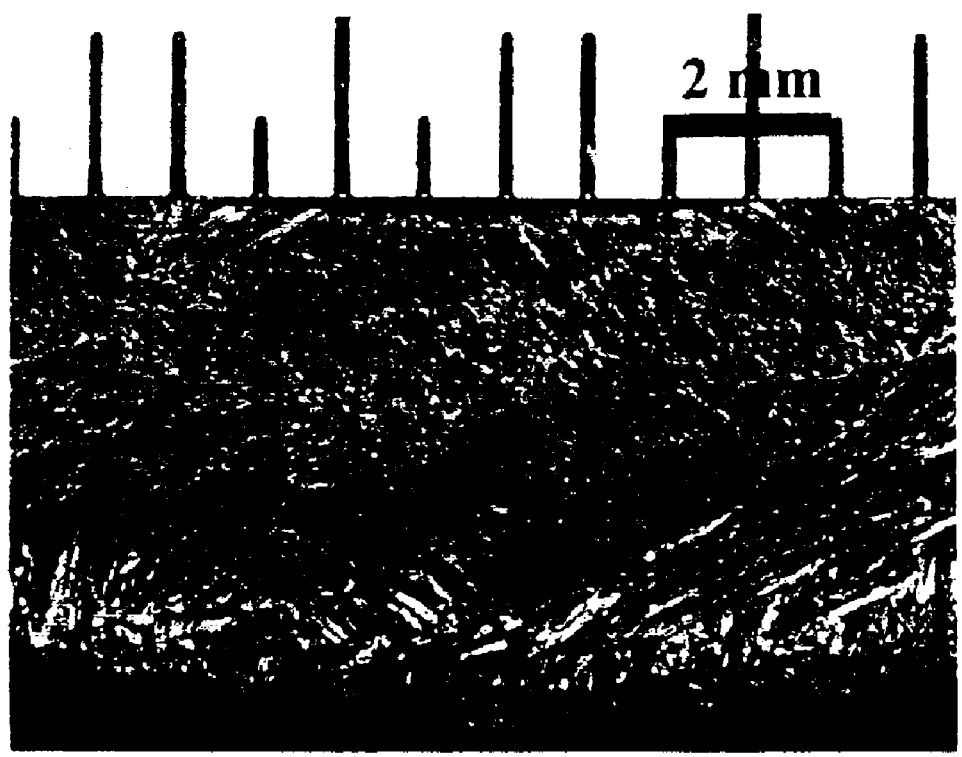
FIG. 5 is a photo micrograph of a conventional C—C material after abbreviated HSFT testing.
Figure 6:
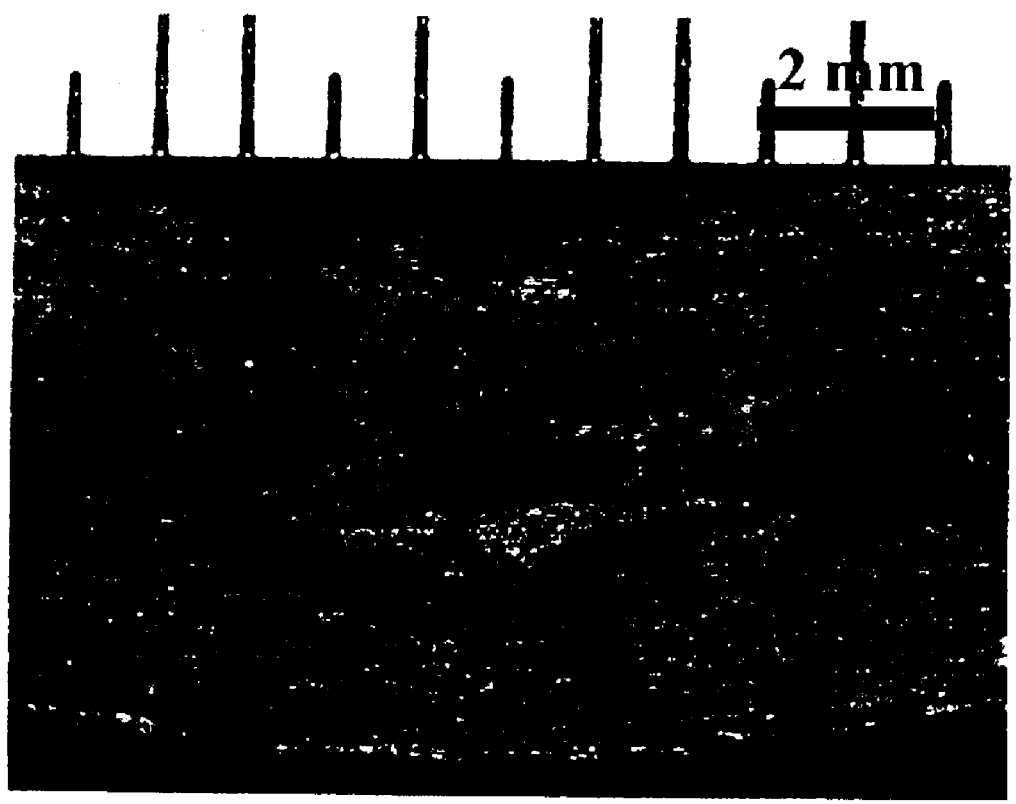
FIG. 6 is a photo micrograph of the CMC material of the present invention after extensive HSFT testing.

5. Improved Environmental Stability—$B_4C$ (oxidation starts at 1500° F.) is known to possess better oxidation resistance than C (oxidation starts at 900° F.), which is believed to decrease or substantially eliminate the dependence on the expensive additional oxidation inhibition systems currently required for improving the overall life expectancy of carbon brakes. Possible improved oxidation performance was demonstrated by similar HFST comparative testing performed on a Duracarb® CMC material containing ~17 vol. % boron carbide +~17 vol. % silicon, and a conventional Duracarb® preform C—C brake material with no application of oxidation inhibitors. The CMC material was tested as described above for standard test sequence. The comparative conventional C—C material was "up" tested using 200 stops at 35 psi, 200 stops at 47 psi, 200 stops at 58 psi, and 100 stops at 69 psi. The C—C testing had to be discontinued due to excessive oxidation near the outer diameter (OD) of the sample. The damage is documented in FIG. 5. Exposed fiber bundles indicative of matrix oxidation are clearly observed at the sample OD, at the bottom of the FIG. 5 photomicrograph. In contrast, FIG. 6 is a similar photomicrograph taken of the Duracarb® CMC material containing ~17 vol. % boron carbide +~17 vol. % silicon of the present invention, subjected to the same "up" testing. No oxidation was observed for the CMC material. Also, no exposed fiber bundles are observed and the machined edge is maintained after a longer test sequence. The preferred embodiment and the best mode of the present invention, as of the present, have been disclosed, explained, detailed and otherwise described. However, the scope of the present invention is not intended to be limited thereby, but rather is intended to be as broad as the scope of the following claims and their equivalents.

What is claimed is:

1. A composite material comprising:
    a.) a fibrous structure which is initially predominantly impregnated with elemental carbon, said fibrous structure which is then subsequently predominantly impregnated with at least one ceramic material which is non-reactive with silicon; and
    b.) a silicon matrix which is continuous and predominantly encompasses said fibrous structure which has been initially predominantly impregnated with elemental carbon and subsequently predominantly impregnated with at least one ceramic material;
said at least one ceramic material of said matrix which has a fine grain crystalline structure of predominantly 20 microns or less in size, said at least one ceramic material which is discontinuous within said matrix, and said fibrous structure which pulls out of said elemental carbon, which initially predominantly impregnates said fibrous structure, when said composite is subjected to fracture.

2. The composite of claim 1 wherein said fibrous structure comprises a plurality of elemental carbon fibers.

3. The composite of claim 1 wherein said silicon matrix is formed from an alloy comprising silicon, boron and carbon.

4. The composite of claim 1 wherein said at least one ceramic structure comprises boron carbide.

5. The composite of claim 1 wherein said fibrous structure comprises a plurality of non-oxide ceramic fibers.

6. The composite of claim 1 wherein said fibrous structure comprises a plurality of oxide ceramic fibers.

7. The composite of claim 1 wherein said silicon matrix is formed from elemental silicon.

8. The composite of claim 2 wherein said initial elemental carbon coating essentially encapsulates each of said plurality of said elemental carbon fibers of said fibrous structure.

9. The composite of claim 1 wherein said silicon matrix is predominantly un-reacted with said fibrous structure.

10. The composite of claim 1 formed into a disk brake heat sink.

11. The composite of claim 10 wherein the wear rate of said disk brake heat sink is one-half or less of the wear rate of an equivalent conventional carbon-carbon disk brake heat sink.

12. A composite material comprising:
    a.) a fibrous structure of elemental carbon, said fibrous structure which is initially predominantly impregnated with elemental carbon, said fibrous structure which is then subsequently predominantly impregnated with at least one ceramic material which is non-reactive with silicon; and
    b.) a silicon matrix which is continuous and predominantly encompasses said fibrous structure which has been initially predominantly impregnated with elemental carbon and subsequently predominantly impregnated with at least one ceramic material;
said at least one ceramic material of said matrix which has a fine grain crystalline structure of predominantly 20 microns or less in size, said at least one ceramic material which is discontinuous within said matrix, and said fibrous structure which pulls out of said elemental carbon, which initially predominantly impregnates said fibrous structure, when said composite is subjected to fracture.

13. The composite of claim 12 wherein said fibrous structure of elemental carbon comprises a plurality of elemental carbon fibers.

14. The composite of claim 12 wherein said silicon matrix is formed from an alloy comprising silicon, boron and carbon.

15. The composite of claim 12 wherein said at least one ceramic material comprises boron carbide.

16. The composite of claim 12 wherein said silicon matrix is formed from elemental silicon.

17. The composite of claim 13 wherein said initial elemental carbon coating essentially encapsulates each of said plurality of said elemental carbon fiber of said fibrous structure.

18. The composite of claim 12 wherein said silicon matrix is predominantly un-reacted with said fibrous structure.

19. The composite of claim 12 formed into a disk brake heat sink.

20. The composite of claim 19 wherein the wear rate of said disk brake heat sink is one-half or less of the wear rate of an equivalent conventional carbon-carbon disk brake heat sink.

21. A composite material comprising:
a.) a fibrous structure of elemental carbon, said fibrous structure which is initially predominantly impregnated with elemental carbon, said fibrous structure which is then subsequently predominantly impregnated with boron carbide; and
b.) a silicon alloy matrix which is continuous and predominantly encompasses said fibrous structure which has been initially predominantly impregnated with elemental carbon and subsequently predominantly impregnated with boron carbide.

22. The composite of claim 21 wherein said boron carbide has a fine grain crystalline structure of predominantly 20 microns or less in size.

23. The composite of claim 21 wherein said boron carbide is discontinuous within said matrix.

24. The composite of claim 21 wherein said fibrous structure of elemental carbon comprises a plurality of elemental carbon fibers.

25. The composite of claim 24 wherein said elemental carbon fibers pull out of said elemental carbon, which initially predominantly impregnates said fibrous structure, when said composite is subjected to fracture.

26. The composite of claim 21 formed into a disk brake heat sink.

27. The composite of claim 26 wherein the wear rate of said disk brake heat sink is one-half or less of the wear rate of an equivalent conventional carbon-carbon disk brake heat sink.

* * * * *

UNITED STATES PATENT AND TRADEMARK OFFICE
CERTIFICATE OF CORRECTION

PATENT NO.   : 6,855,428 B2
DATED        : February 15, 2005
INVENTOR(S)  : Sai-Kwing Lau et al.

It is certified that error appears in the above-identified patent and that said Letters Patent is hereby corrected as shown below:

Column 2,
Line 38, "–35%" should read -- ~35% --.

Column 3,
Line 9, "Monoar" should read -- Monogr. --.

Column 4,
Line 65, "–300" should read -- ~300 --.

Column 5,
Line 17, "–5" should read -- ~5 --.

Column 6,
Line 32, "–1410°" should read -- ~1410° --.

Column 7,
Line 14, "–RTO" should read -- ~RTO --.

Column 8,
Line 5, "–1410°" should read -- ~1410° --.

Column 21,
Line 15, "volt" should read -- vol% --.

Column 22,
Line 8, "detailed and" should read -- detailed, demonstrated and --.

Signed and Sealed this

Sixteenth Day of August, 2005

JON W. DUDAS
*Director of the United States Patent and Trademark Office*